Nov. 14, 1933.   E. S. JOHNSON   1,935,470

FOOD JUG AND LOCK THEREFOR

Filed May 28, 1931

Inventor
Ernest S. Johnson
By his Attorney
M. Theodore Simmons

Patented Nov. 14, 1933

1,935,470

UNITED STATES PATENT OFFICE 1,935,470

FOOD JUG AND LOCK THEREFOR

Ernest S. Johnson, East St. Louis, Ill.; Elizabeth Johnson, executrix of said Ernest S. Johnson, deceased, assignor to Knapp-Monarch Company, a corporation of Missouri Application May 28, 1931. Serial No. 540,611

4 Claims. (Cl. 215—87)

The present invention relates to portable containers, and more particularly to a type of container adapted for the convenient carrying of foodstuffs.

Heretofore, portable containers such as the well known therma jug have been used for the carrying of liquids, either hot or cold. Such containers or jugs are not adaptable for carrying foodstuffs for several reasons, an important reason being the extreme difficulty in both filling and emptying the carrying vessels.

Therefore, it is one object of my invention to provide a container or jug especially adapted for the transportation of foods, either hot or cold, in other than liquid form, wherein the inner vessel, constructed of siliceous or similar material, has a relatively wide mouth or opening.

It is a further object of my invention to provide a container of the above indicated character having an efficiently insulated cover.

It is a still further object of my invention to provide a container of the above indicated character wherein the cover is insulated from the carrying vessel and also from the outer casing.

It is a still further object of my invention to provide a new and improved lock for holding a cover in place.

It is a still further object of my invention to provide a lock that cooperates with the carrying handle and the cover.

It is a still further object of my invention to provide a cam mounted upon the carrying handle and movable to engage the cover to hold the same in place.

Another and further object of my invention is to provide a lock of the above indicated character combining the principles of a cam and a toggle.

Another and further object of my invention is to provide a cam lock for the cover, so arranged that a greater span of the cam will have to be passed when unlocking the cover.

Another and further object of my invention is to provide a container and cover with a cam lock therefor, that will be effective in any position of the cover.

Another and further object of my invention is to provide a cam lock with a stop for its locked position.

A still further object of my invention is to provide a locking cam with a finger piece whereby the same may be moved to its unlocked position.

Other and further objects of my invention will appear from the following specification taken in conjunction with the accompanying drawing, wherein—

Figure 1:
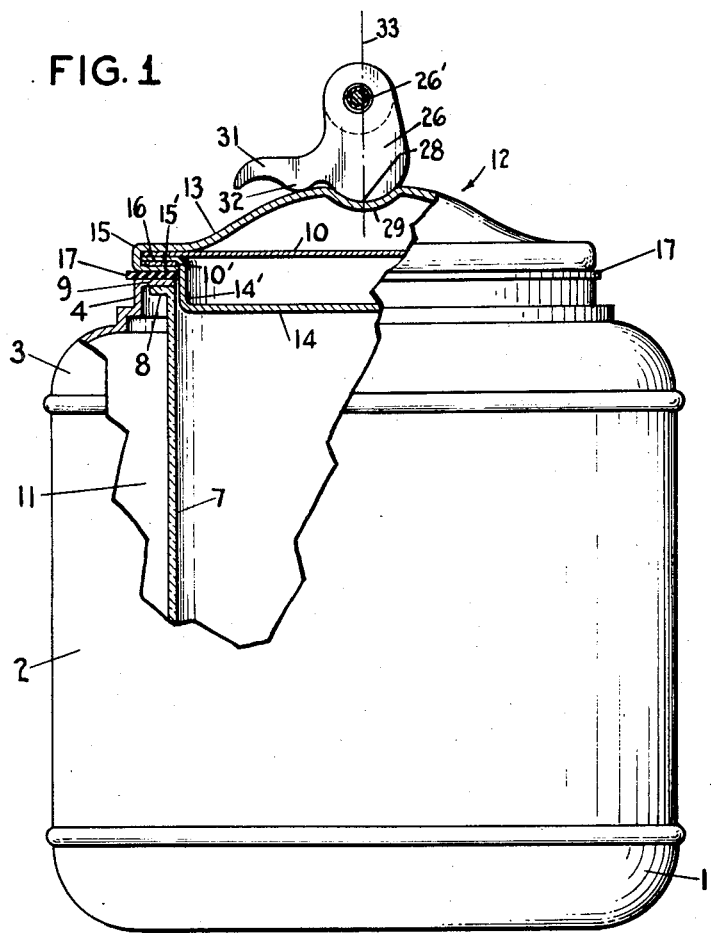
Figure 1 is an elevational view of my improved jug, with parts broken away and parts shown in section.

The illustrated improved jug or food carrying container comprises a metal outer casing consisting of a bottom 1, of pan-like formation, a cylindrical body portion 2, which is surmounted by a top or cap 3 of somewhat similar contour to the bottom 1, except for the addition of a collar 4 in which is the opening allowing access to the interior of the container. The top 3 and collar 4 are integral, but the top 3 and the bottom 1 are seamed or otherwise secured to the body portion 2.

Supported on the interior of the outer casing, and spaced therefrom, is a food carrying vessel 7, which may be formed of any siliceous composition or other material now well known as suitable for the transportation and holding of food stuffs, etc.

It will be noted that the vessel 7 is comparatively wide and of the same diameter from top and bottom. This construction is chosen especially for the reason that the herein described jug or container is intended for use in the convenient transportation of foods, usually cooked foods, on outings, automobile and boat trips, etc., in much the same manner as a large part of the general public now transports liquids in insulated containers or thermos jugs. In transporting bulky foods, such as vegetables and meats, and which it is desired to maintain at a predetermined temperature during transportation, it is necessary that the jug or container be constructed so that it may be readily filled and even more readily emptied when it is desired to consume the food stored therein. Furthermore, vessels used in the carrying of cooked foods require greater facility for cleansing the interior of the vessel with which the goods come in contact. Containers or bottles having constricted necks or openings, heretofore used for liquids, do not meet the named requirements. The wide mouthed jar or vessel 7 provided in my improved container is especially suited for the service intended.

The upper edge of the vessel 7 is provided with an outwardly projecting annular lip 8 which fits under the inwardly projecting annular flange 9 that is integral with the collar 4, an appropriate cement being used to close the joint between the clip 8 and flange 9.

A substantial space exists between the outer wall of the vessel 7 and the inner wall of the outer casing, as indicated at 11, and this space is preferably filled with suitable insulating material, such as ground cork, kapok, and the like.

The vessel 7, and also the outer casing, is closed by a cover 12 which is shown formed of two pieces of sheet metal 13 and 14. The outer or upper piece 13 is arched, as shown, extending upwardly from an annular rim 15. The bottom member 14 comprises a depressed portion 14' of slightly less diameter than the vessel 7, and which fits down into the interior of the vessel as indicated in Fig. 1. It will be noted that the side wall of the depressed part 14 is spaced from the inner wall of the vessel 7, so that there is no direct contact therebetween and therefore no heat transfer therebetween.

The edge of the rim 15 is turned inwardly as indicated at 15' so as to extend around the edge of the outwardly extending annular flange 16 which is a part of the bottom member 14 of the cover. The space between the top and bottom members 13 and 14' of the cover is divided into two dead air spaces by the insertion of the sheet of heat insulating material 10 between the two pieces of the cover as shown in Fig. 1. A gasket 10' may also be provided between the portion 15' and the under surface of the flange 16 so as to prevent metal to metal contact at that point. The flange 16 and rim 15 with the sheet 10 and gasket 10' are then clamped or pressed together. This construction retards the heat leakage from the interior of the vessel through the cover to the atmosphere, and provides a completely insulated container.

When the cover is put in place upon the container, the rim 15 will overlie the rim 9 of the collar 4. It is desired to effect an air tight seal at this point. For this purpose, a rubber ring shaped gasket 17 is fitted around the depressed part 14' of the cover 14 and extends outwardly therefrom beyond the rims 15 and 9. The rubber gasket 17 overlies both the inner and outer edges of the rim 9, thus preventing any possible contact between the two rims. When the cover is pressed in place, as will be hereinafter described, the rubber gasket is compressed and an air tight seal is effected. In addition, the gasket insulates the cover from contact with the vessel 7 and with the outer casing.

Figure 2:
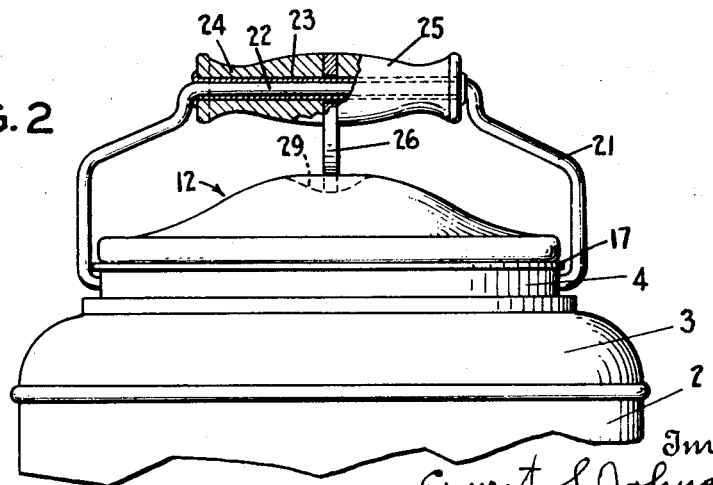
Fig. 2 is a partial front elevational view of my improved jug, showing especially the locking arrangement.

Another important feature of my invention is the method of locking the cover 12 in place so as to effect the air tight seal referred to. In producing this locking, advantage is taken of the resiliency of the carrying handle or bail 21, which is mounted on the container. As shown in Fig. 2, the handle 21 is pivoted in the collar portion 4 of the outer casing so as to swing across the vertical center of the vessel 7 at least a sufficient distance to be out of the way for filling and emptying the vessel.

The handle 21 has a straight central portion 22 on which is mounted a tube 23. Two parts of a hand grip are mounted at either end of said tube 23 as indicated at 24 and 25 respectively, and the tube is flared outwardly at its edges so as to retain the hand grip parts in place.

Also mounted upon the tube 23 is a flat elliptical shaped cam 26 (Fig. 1) which is mounted so as to turn freely with the tube 23. Of course, the cam 26 may be loosely mounted on the tube 23. It will be noted from Fig. 1 that the pivotal mounting point of the cam 26 is well above the horizontal center line of the ellipse and is intersected by the vertical center line of the ellipse, the ellipse being of greatest span along this line between its poles. The upper end of the ellipse 26 is tapered and reduced slightly so as to conform with the contour of the hand grip 24, 25.

The bottom of the cam 26 is curved, as indicated at 28, and this curved part fits into a depression 29 in the center of the top member of the cover. The depression is the shape of a segment of a sphere which is of substantially the same radius as the portion 28 of the cam 26. The distance between the bottom of the depression 29 to the bottom of the portion 22 of the bail is less than the span of the cam 26 from its pivot 26' to the bottom of the portion 28. Hence, when the cam is in locking position (Fig. 1) a definite pressure is exerted on the cover which presses it in place and locks the parts in position.

The cam 26 has projecting from one side thereof a finger piece 31 on the bottom of which is a lug 32 which engages the top of the cover when the cam is in locked position (Fig. 1) thus constituting a stop for the operation of the lock.

The locking and unlocking operation is as follows:

The cover is put in place on the container, the bail or handle 21 is brought approximately over the center of the cover, and the cam 26 is inserted into the depression 29 with the bail 21 in vertical position, and is pressed into locking position by means of finger piece 31, until the stop 32 engages the cover. From Fig. 1, it will be seen that in locked position the pivot 26' of the cam has been carried slightly past the vertical center line of the container indicated at 33. In this position there is sufficient pressure upon the cover to effect the air tight seal desired at the gasket 17, but the low point of the cam portion 28, or the point of maximum pressure, has been passed in putting the cam in locking position, and this point must be passed again in order to unlock the cover. This arrangement eliminates accidental opening or unlocking of the cover. It also will be understood that this latter arrangement is optional.

To unlock the cover, the cam is turned in the reverse direction by means of lifting the finger piece until the pressure is relieved and the cam may be removed from the depression 29.

By means of the arrangement of the parts and the shape of cam and cooperating depression, there is a continually increasing pressure exerted by the cam while being pressed into locking position. Also by using a depression the shape of a segment of a sphere, the cover may be placed upon the vessel 7 without consideration as to the lock, because the depression 29 will always be in position to cooperate with the cam 26 for the locking action.

From the foregoing description, it will be seen that there is provided a practical construction of insulated container and an efficient arrangement for locking the cover in place to effect an air tight seal thereof.

Modifications may be made in the arrangement and location of parts within the spirit and scope of my invention, and such modifications are intended to be covered by the appended claims.

I claim:

1. In a device of the class described, a container, a cover therefor, a handle connected with said container and extending above said cover, a divided hand grip rotatable on said handle and a cam between the divisions of said hand grip and pivotally mounted relative to said handle and relative to said hand grip, said cam being adapted to engage said cover to retain it in position on said container.

2. In a device of the class described, a container, a cover therefor, a handle connected with said container and extending above said cover, a tube on said handle, a divided hand grip and a cam on said tube, said cam being positioned between the divisions of said divided hand grip and being adapted to engage said cover to retain it in position on said container.

3. In a device of the class described, a container, a cover therefor, a handle connected with said container and extending above said cover, a tube on said handle, a divided hand grip and a cam on said tube, said cam being adapted to engage said cover to retain it in position on said container, the ends of said tube being flared to retain said hand grip and said cam thereon.

4. In a device of the class described, a container, a cover therefor, a handle pivotally connected to the container and adapted to swing relative thereto to a position above said cover, a cam member pivotally mounted on said handle and a divided hand grip rotatable on said handle and positioned on each side of said cam member, said divided hand grip and said cam member being capable of pivotal movement independent of each other, said cam member being adapted to engage said cover to retain it in position on said container.

ERNEST S. JOHNSON.